United States Patent [19]

Okamoto et al.

[11] Patent Number: 5,202,293

[45] Date of Patent: Apr. 13, 1993

[54] CARBON FIBER REINFORCED CARBON

[75] Inventors: Mamoru Okamoto, Aichi; Hirohisa Miura, Okazaki; Shoichi Tsuchiya, Toyota; Yoshio Huwa, Toyota; Hirohumi Michioka, Toyota; Masatoshi Kubota, Toyota; Yoshiteru Nakagawa, Yamatokoriyama; Satoru Nakatani, Takatsuki, all of Japan

[73] Assignees: Toyota Jiodosha Kabushiki Kaisha; Osaka Gas Company Limited, both of Japan

[21] Appl. No.: 892,481

[22] Filed: Jun. 3, 1992

Related U.S. Application Data

[63] Continuation of Ser. No. 759,136, Sep. 11, 1991, abandoned, which is a continuation of Ser. No. 464,879, Jan. 17, 1990, abandoned.

[30] Foreign Application Priority Data

| Jan. 17, 1989 | [JP] | Japan | 1-9132 |
| Jan. 19, 1989 | [JP] | Japan | 1-11030 |
| Jan. 19, 1989 | [JP] | Japan | 1-11031 |
| Nov. 24, 1989 | [JP] | Japan | 1-305281 |

[51] Int. Cl.$^5$ .............................. C04B 35/76
[52] U.S. Cl. .......................... 501/95; 501/99
[58] Field of Search ............ 501/95, 99; 427/255.6

[56] References Cited

U.S. PATENT DOCUMENTS

| 3,261,697 | 7/1966 | Parker et al. | 501/99 |
| 3,300,667 | 1/1967 | Boes et al. | 310/228 |
| 3,454,362 | 7/1969 | Spry | 264/29.2 |
| 3,498,929 | 3/1970 | Accountius | 252/503 |
| 3,627,551 | 12/1971 | Olstowski et al. | 252/506 |
| 3,790,393 | 2/1974 | Cowland et al. | 501/99 |
| 3,814,642 | 6/1974 | Araki et al. | 156/60 |
| 3,943,213 | 3/1976 | Whittaker et al. | 264/29 |
| 3,956,436 | 5/1976 | Honda et al. | 264/29 |
| 4,039,341 | 8/1977 | Cooper et al. | 501/99 |
| 4,101,354 | 7/1978 | Shaffer | 156/60 |
| 4,119,189 | 10/1978 | Ehrenreich | 428/371 |
| 4,220,884 | 9/1980 | Sternbergh | 310/251 |
| 4,225,569 | 9/1980 | Matsui et al. | 501/99 |
| 4,347,279 | 8/1982 | Saji et al. | 428/294 |
| 4,659,444 | 4/1987 | Iwata et al. | 204/180.9 |
| 4,671,907 | 6/1987 | Iwahashi et al. | 264/29.5 |
| 4,873,071 | 10/1989 | Yamada et al. | 423/448 |
| 4,883,617 | 11/1989 | Benn et al. | 264/29.7 |
| 4,894,286 | 1/1990 | Gray | 428/408 |
| 4,958,998 | 9/1990 | Yamauchi et al. | 423/445 |
| 4,981,751 | 1/1991 | Daumit et al. | 428/221 |
| 4,983,451 | 1/1991 | Sugino et al. | 422/283 |
| 4,986,943 | 1/1991 | Sheaffer et al. | 264/29.1 |
| 5,051,300 | 9/1991 | Rousseau | 428/245 |

FOREIGN PATENT DOCUMENTS

| 0280233 | 8/1988 | European Pat. Off. . | |
| 51-106107 | 9/1976 | Japan | 501/99 |
| 63-206351 | 8/1988 | Japan . | |
| 63-265863 | 11/1988 | Japan . | |
| 63-319258 | 12/1988 | Japan . | |

OTHER PUBLICATIONS

"Carbon-fiber-reinforced carbon composites from high-modulus fibers and mesophase precursor pitch", Chemical Abstracts, vol. 109, No. 22, Nov. 1988, p. 360.
"Carbon fiber-reinforced carbon composites", Chemical Abstracts, vol. 110, No. 9, May 1989, p. 330.
"Carbon fiber-reinforced composite materials of high density and strength", Chemical Abstracts, vol. 108, No. 18, May 1988, pp. 318–319.

*Primary Examiner*—Karl Group
*Assistant Examiner*—Anthony J. Green
*Attorney, Agent, or Firm*—Finnegan, Henderson, Farabow, Garrett & Dunner

[57] ABSTRACT

A carbon fiber reinforced carbon of the present invention is composed of a sintered body comprising precursor carbonaceous fiber and self-sintering carbonaceous powder with the precursor carbonaceous fiber buried therein. Since the precursor carbonaceous fiber working as a reinforcement and the self-sintering carbonaceous powder working as a binder come to have substantially the same physical properties (strength, shrinkage rate and the like), the boudary adhesion between them improves, thereby giving the sintered body high strength and excellent abrasion resistance. When the precursor carbonaceous fiber is subjected to a surface treatment using a viscous material, the wettability of the surface of the precursor carbonaceous fiber increases, thereby further improving the boundary adhesion between the precursor carbonaceous fiber and the self-sintering precursor carbonaceous powder.

47 Claims, 7 Drawing Sheets

CARBON FIBER REINFORCED CARBON

This application is a continuation of application Ser. No. 07/759,136, filed Sep. 11, 1991, now abandoned, which is a continuation of application Ser. No. 07/464,879, filed Jan. 17, 1990, now abandoned.

BACKGROUND OF THE INVENTION

1. Field of the Invention

The present invention relates to a carbon fiber reinforced carbon having high strength, excellent heat resistance, abrasion resistance and anti-oxidation resistance. The carbon fiber reinforced carbon is suitable to a sliding material for making a brake shoe and a brake lining of an aircraft and a racing car, and a bearing for a high temperature application.

2. Description of the Prior Art

A sliding member utilized for an aircraft, a racing car and the like especially requires heat resistance and abrasion resistance. Recently, carbon fiber reinforced carbon has been provided therefor. This carbon fiber reinforced carbon is produced by impregnating a liquid carbonaceaous material (a binder), such as tar, pitch and thermosetting resin into carbon fiber (a reinforcement) which has been carbonized or graphitized and oxidized beforehand. Then, the resulting binder impregnated carbon fiber is sintered in an inert atmosphere. If necessary, the resulting sintered product is graphitized thereafter (Japanese Unexamined Patent Publication No. 206351/1988).

Since the carbon fiber reinforced carbon thus produced uses the liquid carbonaceous material as a binder, volatile substances are generated by the decomposition of the liquid carbonaceous material during the sintering, thereby forming pores. Accordingly, the boundary adhesion between the reinforcement and the binder deteriorates, and the density of the product decreases. The product is accordingly inferior in the strength and the abrasion resistance. Moreover, when a product of a large size is made of the carbon fiber reinforced carbon, such a product lacks homogeneity.

To solve these problems, the pores of the product are filled with a liquid impregnant as a binder, and the product is sintered again to decrease the porosity. But, in spite of these complicated processes, the product is still porous. In addition, these complicated processes have resulted in the increasing manufacturing cost.

Further, a CVD (chemical vapor deposition) method is proposed to solve these problems. In the CVD method, a hydrocarbon gas is decomposed in a high temperature oven and decomposed products are deposited on the surface of the carbon fiber. However, since a uniform thermal decomposition should be done for a long period of time in this method under the condition that no soot should be generated, a sophisticated technique is required to control the condition. Accordingly, the CVD method cannot be done practically.

SUMMARY OF THE INVENTION

It is an object of the present invention to provide a carbon fiber reinforced carbon having high strength and excellent abrasion resistance.

It is another object of the present invention to provide a carbon fiber reinforced carbon producible at low cost.

It is further object of the present invention to provide a carbon fiber reinforced carbon to be used as a sliding member.

A carbon fiber reinforced carbon of the present invention is composed of a sintered body comprising precursor carbonaceous fiber and self-sintering carbonaceous powder with the precursor carbonaceous fiber buried therein.

The shape of the carbon fiber reinforced carbon is not restricted particularly. For example, the shape may be a brake shoe shape, a brake lining shape, or a bearing shape.

The precursor carbonaceous fiber constitutes a reinforcement of the carbon fiber reinforced carbon of the present invention. The raw material of the precursor cabonaceous fiber is not restricted particularly. For example, the raw material may be PAN (polyacrylonitrile), rayon, or pitch and the like.

Here, the precursor carbonaceous fiber is a carbonaceous fiber which has not been completely carbonized. To be concrete, it may be pitch fiber obtained by only spinning coal or petroleum pitch as raw material, or infusible pitch fiber obtained by making the spun pitch fiber infusible at the temperature less than 550° C., more preferably at the temperature less than 500° C. The precursor carbonaceous fiber may be a polymer fiber such as PAN fiber and the like which has been decomposed at the temperature less than 550° C., more preferably at the temperature less than 500° C. The spinning of the raw pitch and making the spun pitch fiber infusible may be conducted as follows. The pitch fiber may be obtained in the following manner: The pitch is supplied in a spinning machine, heated at the temperature of about 300°–400° C., and extruded through a nozzle of the spinning machine by applying a pressure of an inert gas. The pitch fiber thus obtained may be made into the infusible pitch fiber by heating the pitch fiber at 150°–500° C. for 0.5–5 hours in an oxidizing atmosphere.

The raw pitch may be either optically isotropic or optically anisotropic. Since the precursor carbonaceous fiber obtained from the optically isotropic raw pitch is hard to cut due to its amorphous structure, the carbon fiber reinforced carbon made of the optically isotropic and precursor carbonaceous fiber has excellent abrasion resistance in particular. Moreover, since the precursor carbonaceous fiber obtained from the optically anisotropic raw pitch is liable to peel off due to its laminated structure, the carbon fiber reinforced carbon made of the optically anisotropic and precursor carbonaceous fiber has excellent seizure resistance in particular.

As to the fiber length, a short fiber or a long fiber may be used. When using a short fiber, the length thereof may be 0.01–50 mm, and particularly a short fiber having the length of 0.03–10 mm is preferred in view of the easy mixing and the aspect ratio. If it is too long, the fibers get entangled to deteriorate the dispersibility and finally the isotropy, one of the product properties. If it is less than 0.01 mm, the strength of the product decreases sharply. As to the fiber diameter, 5–25 μm is preferred. Further, a non-woven fabric or a coating fabric made of the fiber may be used.

Preferably, the precursor carbonaceous fiber may be subjected to a surface treatment using a viscous material such as tar, pitch and organic polymer to improve the conformability with a binder. This surface treatment may be conducted by stirring 100 parts by weight of the carbonaceous fiber with 100–1000 parts by weight of the viscous material. The mixture is then washed with an organic solvent, and dried.

The tar or pitch may be used for the surface treatment. The tar or pitch may be derived either from coal or petroleum. When the pitch is used, the heat treatment of about 140°-170° C. is required during the stirring. The tar is accordingly preferred for the viscous material. Further, coal tar is more preferred in view of the material loss in the subsequent carbonizing and graphitizing process.

The organic polymer may be phenol resin, polyvinyl chloride, polyvinyl alcohol and the like.

The organic solvent used for the above-mentioned washing may be an aromatic solvent such as toluene and xylene. The washing is conducted by stirring 100 parts by weight of mixture of the fiber and the viscous material with 100-1000 parts by weight of the organic solvent to remove light oil components containing many volatile substances. The precursor carbonaceous fiber thus washed is dried by heating and/or depressurizing in a non-oxidizing atmosphere such as nitrogen or argon. The drying is not restricted to the above so long as the organic solvent can be removed.

Further, the dried precursor carbonaceous fiber thus surface-treated is dispersed if required, since the dried precursor carbonaceous fiber is apt to come together in a mass or aggregate. The dispersion may be conducted by an ordinary means such as a powder mill, an atomizer, a pulverizer and the like.

The self-sintering carbonaceous powder constitutes a binder of the carbon fiber reinforced carbon of the present invention. The self-sintering carbonaceous powder is powder having self-sintering property and not being completely carbonized. The self-sintering carbonaceous powder may be derived either from coal or petroleum. To be concrete, mesocarbon microbeads, pulverized bulkmesophase powder, pulverized low temperature calcined coke, pulverized crude coke and the like may be used.

In particular, the mesocarbon microbeads of coal or petroleum is preferred in view of its uniform and stable grain size and composition. Further, the mesocarbon microbeads of coal is more preferred in view of the material loss. The self-sintering carbonaceous powder having the grain size of less than 30 μm and the β-resin amount of about 3-50% is preferred.

The precursor carbonaceous fiber and the self-sintering cabonaceous powder is mixed and formed into a composite body. The mixing method is not restricted particularly so long as they are mixed uniformly to make the strength and abrasion resistance isotropic. Here, the precursor carbonaceous fibers are oriented at random.

The composition of the precursor carbonaceous fiber and the self-sintering carbonaceous powder is 100 parts by weight of the former to 2-70 parts by weight of the latter. More preferably, it is 100 parts by weight of the former to 10-50 parts by weight of the latter.

The forming operation may be conducted by a normal molding method. In the forming operation, a mixture of the precursor carbonaceous fiber and the self-sintering carbonaceous powder is formed in a mold. The CIP method may be employed. The forming operation is usually conducted under the pressure of 1-10 ton/cm$^2$. The temperature of the forming operation may be a normal temperature or the temperature of 500° C. in an inert gas atmosphere.

The composite body is sintered, and made into the carbon fiber reinforced carbon of the present invention. Here, the sintering is to solidify the precursor carbonaceous fiber and the self-sintering carbonaceous powder by heating at about 700°-1300° C.

The sintering operation is not restricted particularly. Usually, the sintering may be conducted by increasing the temperature starting at a normal temperature to about 1300° C. at the rate of about 0.1°-300° C./hour and by keeping the temperature of about 1300° C. for about 0.5-10 hours in a non-oxidizing atmosphere.

After the sintering, the sintered product is preferably graphitized. The graphitizing operation may be conducted by increasing the temperature starting at the sintering temperature to 1500°-3000° C. at the rate of about 0.1°-500° C./hour and by keeping the temperature of about 1500-3000° C. for about 0.5-10 hours in a non-oxidizing atmosphere. When the composite body is graphitized, the graphite crystals have grown fully and oriented orderly to improve the density, strength and abrasion resistance of the product.

In the present invention, the composite body before sintering comprises the precursor carbonaceous fiber and the self-sintering carbonaceous powder with the precursor carbonaceous fiber buried therein.

Accordingly, when sintering the composite body, no liquid carbonaceous materials working as a binder are needed. This is because the self-sintering carbonaceous powder working as a binder has self-sintering property. Consequently, it is not necessary to repeat the impregnating and sintering operation in order to fill up the pores which are formed when using a liquid binder. Thus, the carbon fiber reinforced carbon of the present invention can be produced inexpensively.

Further, since the precursor carbonaceous fiber working as a reinforcement has not been completely carbonized yet, the precursor carbonaceous fiber and the self-sintering carbonaceous powder working as a binder come to have substantially the same physical properties on the strength and the shrinkage rate when the precursor carbonaceous fiber and the self-sintering carbonaceous powder have been sintered. Accordingly, the boundary adhesion between the precursor carbonaceous fiber and the self-sintering carbonaceous powder has been improved. Thus, a product of high strength and excellent abrasion resistance can be obtained.

Furthermore, when the precursor carbonaceous fiber is subjected to the surface treatment using the viscous material such as tar, pitch and organic polymer, the wettability of the surface of the precursor carbonaceous fiber increases. The boundary adhesion between the precursor carbonaceous fiber and the self-sintering carbonaceous powder has been thus further improved since the conformability between the fiber and the powder is increased.

DETAILED DESCRIPTION OF THE PREFERRED EMBODIMENTS

Example 1

Optically isotropic coal pitch was supplied in a spinning machine, heated at temperature of 340° C., and extruded through a nozzle of the spinning machine by applying a pressure of an insert gas. The pitch fiber thus obtained was heated at 350° C. for 2 hours in an oxidizng atmosphere to obtain infusible pitch fiber as an precursor carbonaceous fiber.

Three (3) precursor carbonaceous fibers having the diameter of 15 μm and the length of 0.2–0.5 mm, 3 mm and 5 mm, respectively were prepared from the infusible pitch fiber. 100 parts by weight of these three (3) precursor carbonaceous fibers working as a reinforcement were added respectively to 900 parts by weight of coal tar mesocarbon microbeads as a self-sintering and carbonaceous powder working as a binder, and the mixtures were mixed uniformly. The coal tar mesocarbon microbeads had the average grain size of 7 um. The resulting mixtures were put in a mold and formed into composite bodies having a predetermined shape of a sliding member by applying the pressure of 2 ton/cm².

The resulting composite bodies were sintered by increasing the temperature from a normal temperature to 1000° C. at the rate of 150° C./hour and by maintaining the temperature of 1000° C. for 1 hour in a non-oxidizing atmosphere, thereby perfectly carbonizing and solidifying the precursor carbonaceous fibers and the self-sintering carbonaceous powder. Then, the sintered composite bodies were graphitized by increasing the temperature to 2800° C. at the rate of 500° C./hour and by maintaining the temperature of 2800° C. for 20 minutes in a non-oxidizing atmosphere.

Three (3) sliding members of Example 1 made of carbon fiber reinforced carbon were thus obtained.

Example 2

Infusible pitch fiber were prepared as an precursor carbonaceous fiber in the same manner as Example 1 except that optically anisotropic coal pitch was used. Three (3) precursor carbonaceous fibers having the diameter of 10 μm and the length of 0.2–0.5 mm, 3 mm and 5 mm, respectively were prepared from the infusible pitch fiber.

Three (3) sliding members of Example 2 made of carbon fiber reinforced carbon were obtained in the same manner as Example 1 except that these three (3) precursor carbonaceous fibers were used as a reinforcement.

Comparative Examples 1–3

The three (3) precursor carbonaceous fibers used as the reinforcement in Example 1 were further carbonized at 550° C. and 1000° C., and graphitized at 2800° C. to prepare completely carbonized carbonaceous fibers and graphitized carbonaceous fiber.

Three (3) sliding members of Comparative Example 1 were obtained in the same manner as Example 1 except that the three (3) carbonaceous fibers further carbonized at 550° C. were used as the reinforcement.

Another three (3) sliding members of Comparative Example 2 were obtained in the same manner as Example 1 except that the three (3) carbonaceous fibers further carbonized at 1000° C. were used as the reinforcement.

Still another three (3) sliding members of Comparative Example 3 were obtained in the same manner as Example 1 except that the three (3) carbonaceous fibers graphitized at 2800° C. were used as the reinforcement.

Comparative Examples 4–6

The three (3) precursor carbonaceous fibers used as the reinforcement in Example 2 were further carbonized at 550° C. and 1000° C., and graphitized at 2800° C. to prepare completely carbonized carbonaceous fibers and graphitized carbonaceous fiber.

Three (3) sliding members of Comparative Example 4 were obtained in the same manner as Example 2 except that the three (3) carbonaceous fibers further carbonized at 550° C. were used as the reinforcement.

Another three (3) sliding members of Comparative Example 5 were obtained in the same manner as Example 2 except that the three (3) carbonaceous fibers further carbonized at 1000° C. were used as the reinforcement.

Still another three (3) sliding members of Comparative Example 6 were obtained in the same manner as Example 2 except that the three (3) carbonaceous fibers graphitized at 2800° C. were used as the reinforcement.

Evaluation 1

The bending strength of the sliding members of Examples 1–2 and Comparative Examples 1–6 was measured, respectively. The results are set forth in Table 1.

TABLE 1

| Sample | Carbonaceous Fiber Optical Property | Fiber Dia. | Carbonizing | Graphitizng | Bending Strength (Kgf/cm²) Fiber Length (mm) 0.2 to 0.5 | 3 | 5 |
| --- | --- | --- | --- | --- | --- | --- | --- |
| Example 1 | Isotropy | 15 | None | None | 869 | 772 | 750 |
| Comparative Example 1 | Isotropy | 15 | 550° C. | None | 385 | 33 | (Note 2) |
| Comparative Example 2 | Isotropy | 15 | 1000° C. | None | 301 | 46 | 44 |
| Comparative Example 3 | Isotropy | 15 | — | 2800° C. | 365 | 45 | 63 |
| Example 2 | Anisotropy | 10 | None | None | 652 | 156 | 627 |
| Comparative Example 4 | Anisotropy | 10 | 550° C. | None | 575 | 93 | 125 |
| Comparative Example 5 | Anisotropy | 10 | 1000° C. | None | (Note 1) | (Note 1) | (Note 1) |
| Comparative Example 6 | Anisotropy | 10 | — | 2800° C. | (Note 1) | (Note 1) | (Note 1) |

(Note 1) ... Not measurable, broken at manually applicable low load
(Note 2) ... Not formable The sliding members of Examples 1–2, in which the precursor carbonaceous fibers were used as the reinforcement, had a sharply improved bending strength. The bending strength thereof was greater than that of the sliding members of Comparative Examples 1–6, in which the completely carbonized or graphitized carbonaceous fibers were used as the reinforcement.

This is considered as follows. Since the sliding members of Examples 1–2 employ the precursor carbonaceous fiber and the self-sintering carbonaceous powder which have not been completely carbonized, they come to have substantially the same shrinkage rate during the sintering, and the boundary adhesion between the precursor carbonaceous fiber and the self-sintering carbonaceous powder increases, thereby improving the bending strength.

On the other hand, since the sliding members of Comparative Examples 1–6 employ completely carbonized or graphitized carbonaceous fibers as the reinforcement, the completely carbonized or graphitized carbonaceous fibers and the self-sintering carbonaceous powder respectively had different shrinkage rates during the sintering. Therefore, the boundary adhesion between the completely carbonized or graphitized carbonaceous fibers and the self-sintering carbonaceous powder decreases, thereby deteriorating the bending strength.

Example 3

Precursor carbonaceous fiber having the diameter of 15 μm and the length of 0.5 mm was prepared in the same manner as Example 1. Coal tar mesocarbon microbeads was prepared for a self-sintering carbonaceous powder working as a binder. The coal tar mesocarbon microbeads had the average grain size of 7 μm.

30 parts by weight of the precursor carbonaceous fiber were added to and mixed uniformly with 70 parts by weight of the self-sintering carbonaceous powder. The resulting mixture was put in a mold and formed into a composite body having a predetermined shape of sliding member by applying a pressure of 2 ton/cm².

The resulting composite body was sintered by increasing the temperature from a normal temperature to 1000° C. at the rate of 150° C./hour and by maintaining the temperature of 1000° C. for 1 hour in a non-oxidizing atmosphere, thereby perfectly carbonizing and solidifying the precursor carbonaceous fiber and the self-sintering carbonaceous powder. Then, the composite body was graphitized by increasing the temperature to 2000° C. at the rate of 500° C./hour and by maintaining the temperature of 2000° C. for 20 minutes in a non-oxidizing atmosphere.

A sliding member of Example 3 made of carbon fiber reinforced carbon was thus obtained, and had the density of 1.82 g/cm (true density of 2.1 g/cm³) and the bending strength of 775 kg/cm².

Example 4

500 parts by weight of tar were added to 100 parts by weight of precursor carbonaceous fiber. The precursor carbonaceous fiber was infusible fiber having the diameter of 15 μm and the length of 0.5 mm which was prepared in the same manner as Example 1. The mixture was stirred for 15 minutes, and filtered at a normal temperature. Then, 500 parts by weight of toluene were added to the filter cake. The mixture was stirred for 30 minutes, and filtered again. The filter cake was dried at 150° C. for 3 hours in a nitrogen atmosphere. The tar-treated precursor carbonaceous fiber was thus prepared.

30 parts by weight of the resulting tar-treated precursor carbonaceous fiber were added to and mixed uniformly with 70 parts by weight of the self-sintering carbonaceous powder working as a binder. The self-sintering carbonaceous powder was coal tar mesocarbon microbeads having the average grain size of 7 μm. The mixture was formed into a composite body, carbonized and graphitized in the same manner as Example 1.

A sliding member of Example 4 made of carbon fiber reinforced carbon was thus obtained, and had the density of 1.84 g/cm³ (true density of 2.1 g/cm³) and the bending strength of 930 kg/cm².

Evaluation 2

Figure 1:
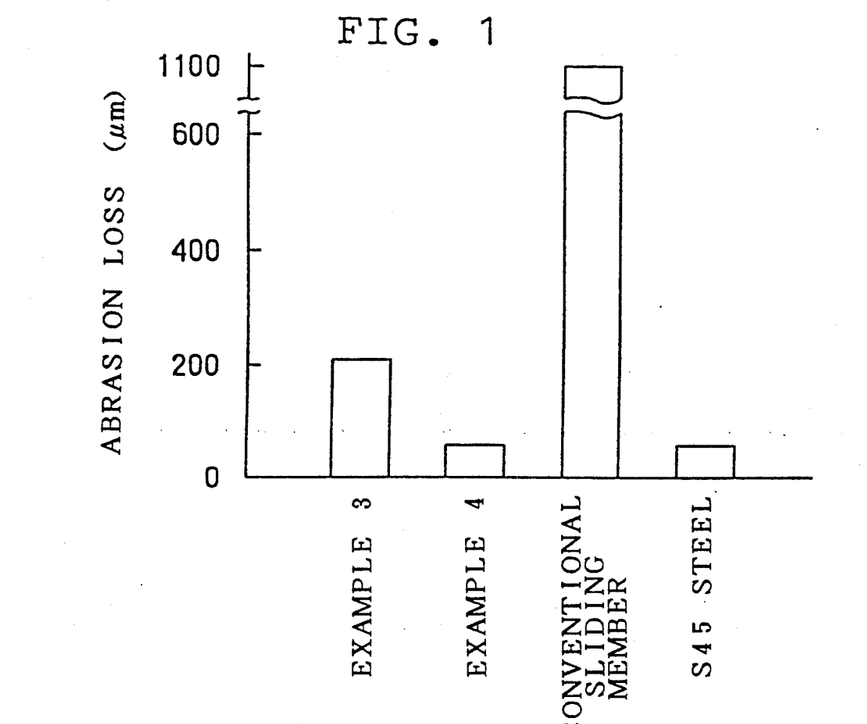
FIG. 1 is a column chart showing the results of an abrasion resistance test on the sliding members of Examples 3 and 4 of the present invention, a sliding member comprising commercially available conventional carbon fiber reinforced carbon, and a sliding member comprising steel.

To examine the abrasion resistance of the sliding members of Examples 3–4, an abrasion test was conducted with an LFW friction/abrasion tester (Falex Ring & Block Tester) under the following conditions:
Oil lubrication;
Load of 15 kgf;
Speed of 160 r.p.m.;
Testing time of 60 minutes; and
Mating member made of SUJ2 (as per JIS).
The results of this abrasion test on the sliding members of Examples 3–4 are shown in FIG. 1. The results of the abrasion test on a conventional sliding member made of the commercially available conventional carbon fiber reinforced carbon and a sliding member made of S45 steel are also shown in FIG. 1. The conventional sliding member was made by impregnating carbonaceous fiber with petroleum pitch as a liquid carbonaceous material and sintering them at 2000° C. in an insert atmosphere.

The abrasion loss of the sliding member of Example 3 was about 200 μm, and the abrasion loss of the sliding member of Example 4 using the tar-treated precursor carbonaceous fiber was about 65 μm. The abrasion loss of the sliding member of Example 4 was as small as that of the sliding member made of S45 steel. On the other hand, the abrasion loss of the conventional sliding member made of the commercially available conventional carbon fiber reinforced carbon was more than 1100 μm.

Accordingly, the sliding members of Examples 3-4 had excellent abrasion resistance. This is considered as follows. Since the sliding member of Example 3 employs the precursor carbonaceous fiber and the self-sintering carbonaceous powder, they come to have substantially the same physical properties (strength, shrinkage rate and the like) during the sintering, thereby increasing the boundary adhesion between the carbonaceous fiber and the carbonaceous powder. Further, since the sliding member of Example 4 employs the tar-treated precursor carbonaceous fiber, the wettability of the surface of the tar-treated precursor carbonaceous fiber is enhanced, thereby further improving the boundary adhesion between the carbonaceous fiber and the carbonaceous powder.

On the other hand, since the sliding member made of the commercially available conventional carbon fiber reinforced carbon employed the liquid carbonaceous material as the binder, volatile substances were generated by the decomposition of the liquid binder. Whereby the pores were generated during the sintering. Accordingly, the boundary adhesion between the reinforcement and the binder had deteriorated. Further, since the conventional sliding member employed the completely carbonized or graphitized carbonaceous fiber as the reinforcement and the liquid carbonaceous material as the binder, they had different physical properties during the sintering. As a result, the boudary adhesion between the reinforcement and the binder had deteriorated.

Evaluation 3

Figure 2:
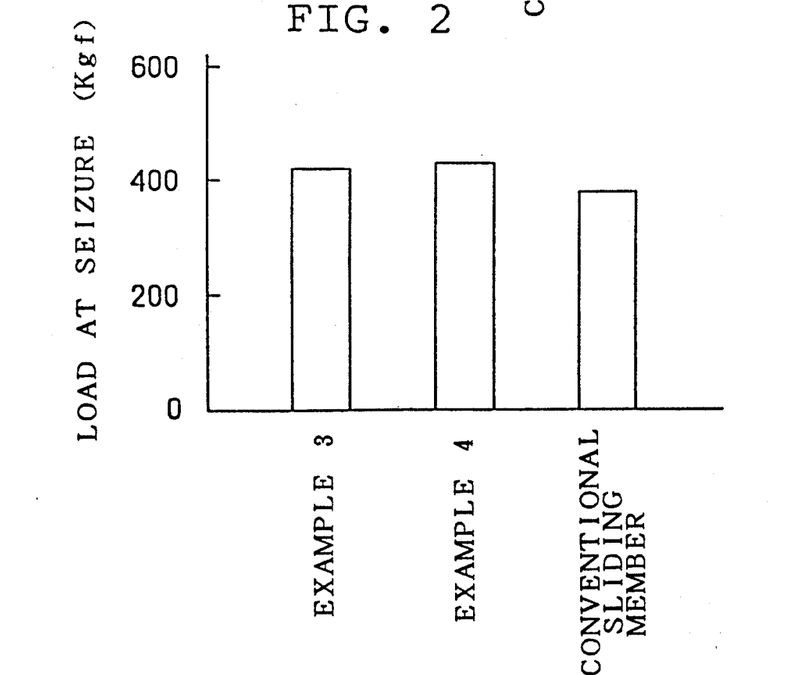
FIG. 2 is a column chart showing the results of a seizure resistance test on the sliding members of Examples 3 and 4 of the present invention and the sliding member comprising commercially available conventional carbon fiber reinforced carbon.

To examine the seizure resistance of the sliding members of Examples 3-4, a seizure test was conducted with a machine testing laboratory type friction/abrasion tester under the following conditions:
Oil lubrication;
Load increasing at the rate of 25 kgf per 2 minutes;
Speed of 1000 r.p.m.; and
Mating member made of SUJ2 (as per JIS).
The results of this seizure test on the sliding members of Examples 3-4 are shown in FIG. 2. The results of the seizure test on a conventional sliding member made of the commercially available conventional carbon fiber reinforced carbon are also shown in FIG. 2. The conventional sliding member was the same as used in Evaluation 1.

The sliding members of Examples 3-4 exhibited the load at seizure greater than that of the conventional sliding member made of the commercially available conventional carbon fiber reinforced carbon.

Figure 3:
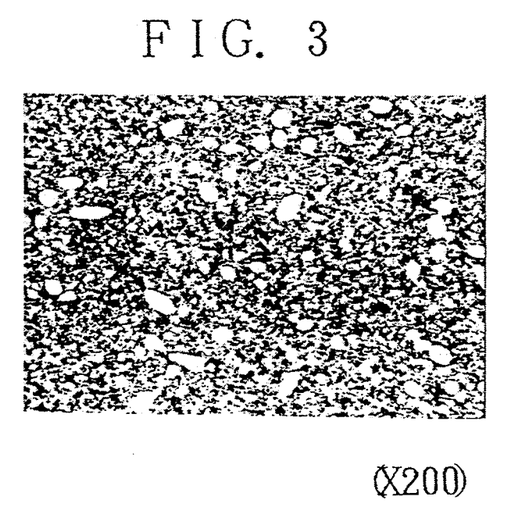
FIG. 3 is a microphotograph showing the cross-sectional particulate structure of the sliding member of Example 4 of the present invention (Magnification×200).

FIG. 3 is a microphotograph showing the cross-sectional particulate structure of the sliding member of Example 4 (Magnification×200). In FIG. 3, white portions are carbonaceous fibers and black portions are bonding parts of carbonaceous powder. Part of the black portions includes voids, however the voids occupy small area.

Figure 4:
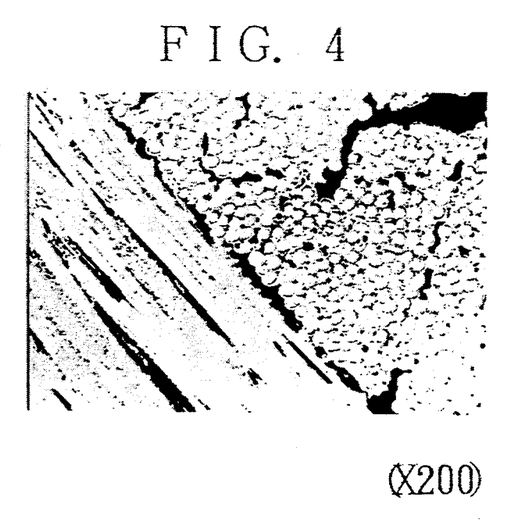
FIG. 4 is a microphotograph showing the cross-sectional particulate structure of the sliding member comprising commercially available conventional carbon fiber reinforced carbon (Magnification×200).

FIG. 4 is a microphotograph showing the cross-sectional particulate structure of the sliding member comprising the conventional carbon fiber reinforced carbon (Magnification×200). In FIG. 4, white circular portions at the right are the transverse cross sections of the carbonaceous fibers and white columns or portions at the left are the longitudinal cross sections of the carbonaceous fibers. The black portions are voids, and the voids occupy large area.

Example 5

A sliding member of Example 5 was obtained in the same manner as Example 1 except that precursor carbonaceous fiber having the diameter of 15 μm and the length of 6 mm was employed as a reinforcement.

Example 6

A sliding member of Example 6 was obtained in the same manner as Example 4 except that precursor carbonaceous fiber having the diameter of 15 μm and the length of 6 mm was employed as a reinforcement.

Example 7

A sliding member of Example 7 was obtained in the same manner as Example 6 except that coal tar mesocarbon microbeads having the average diameter of 5 um was employed as a binder.

Evaluation 4

The bending strength and the density of the sliding members of Examples 5-7 were measured. The results are shown in Table 2.

TABLE 2

| | Bending Strength (Kgf/cm) | Density (g/cm$^3$) |
|---|---|---|
| Example 5 | 791 | 1.82 |
| Example 6 | 850 | 1.85 |
| Example 7 | 860 | 1.87 |

It is understood from the Table 2 that the bending strength was increased by 60-70 kg/cm$^2$ by treating the surface of the precursor carbonaceous fiber with tar.

Example 8

A sliding member of Example 8 was obtained in the same manner as Example 4 except that precursor carbonaceous fiber having the diameter of 15 μm and the length of 0.5 mm was employed as a reinforcement, and that the temperature of the graphitizing was 2000° C.

Evaluation 5

Figure 5:
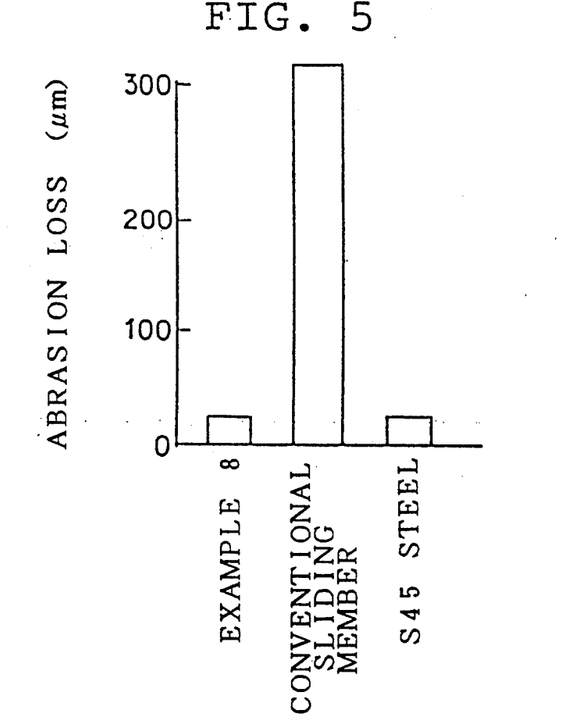
FIG. 5 is a column chart showing the results of the abrasion resistance test on the sliding member of Example 8 of the present invention, the sliding member comprising commercially available conventional carbon fiber reinforced carbon, and the sliding member comprising steel.

To examine the abrasion resistance of the sliding member of Example 8, an abrasion test was conducted with the LFW friction/abrasion tester under the following conditions:
Oil lubrication;
Load of 15 kgf;
Speed of 160 r.p.m.;
Testing time of 15 minutes; and
The results of this abrasion test on the sliding member of Example 8 are shown in FIG. 5. The results of the abrasion test on a conventional sliding member made of the commercially available conventional carbon fiber reinforced carbon and a sliding member made of S45 steel are also shown in FIG. 5. The conventional sliding member was the same as used in Evaluation 1.

It is readily understood from FIG. 5 that the abrasion loss of the sliding member of Example 8 was about one-tenth of that of the commercially available conventional sliding member.

Evaluation 6

Figure 6:
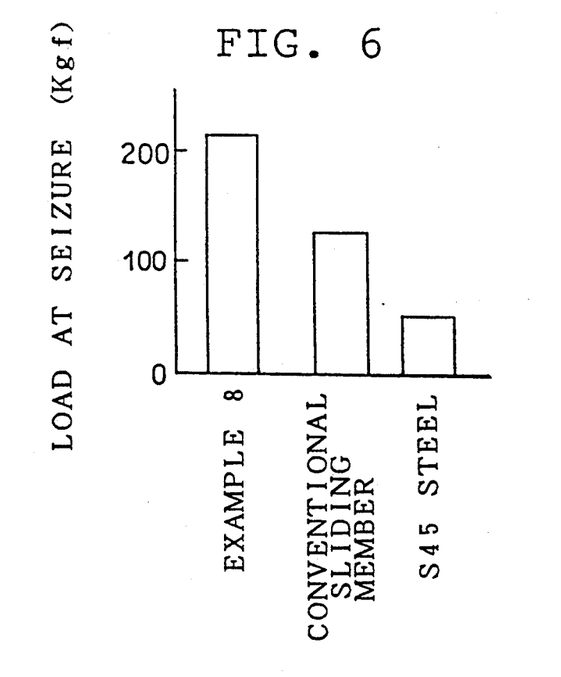
FIG. 6 is a column chart showing the results of the seizure resistance test on the sliding member of Example 8 of the present invention, the sliding member comprising commercially available conventional carbon fiber reinforced carbon, and the sliding member comprising steel.

To examine the seizure resistance of the sliding member of Example 8, a seizure test was conducted with the machine testing laboratory type friction/abrasion tester under the following conditions:
No oil lubrication;
Load increasing at the rate of 10 kgf per 2 minutes;
Speed of 160 r.p.m.; and
Mating member made of SUJ2 (as per JIS).
The results of this seizure test on the sliding member of Example 8 are shown in FIG. 6. The results of the seizure test on a sliding member made of the commercially available conventional carbon fiber reinforced carbon and a sliding member made of S45 steel are also shown in FIG. 6. The conventional sliding member was the same as used in Evaluation 1.

It is readily understood from FIG. 6 that the sliding member of Example 8 was not likely to suffer from the seizure even under no oil lubrication.

Example 9

10, 20, 30, 40 and 50 parts by weight of the tar-treated precursor carbonaceous fiber obtained in Example 4 was added respectively to 90, 80, 70, 60 and 50 parts by weight of the self-sintering carbonaceous powder. The self-sintering carbonaceous powder was coal tar mesocarbon microbeads having the average grain size of 7 μm. The resulting five (5) mixtures were formed into a composite body, carbonized and graphitized in the same manner as Example 4.

Five (5) sliding members of Example 9 were thus obtained.

Example 10

Precursor carbonaceous fiber was prepared and subjected to the surface treatment using tar in the same manner as Example 4. Here, optically anisotropic coal pitch was used for the infusible pitch fiber instead of the optically isotropic coal pitch used in Example 4. 10, 20 and 30 parts by weight of the tar-treated precursor carbonaceous fiber was added respectively to 90, 80 and 70 parts by weight of the self-sintering carbonaceous powder. The self-sintering carbonaceous powder was coal tar mesocarbon microbeads having the average grain size of 7 μm. The resulting three (3) mixtures were formed into a composite body, carbonized and graphitized in the same manner as Example 4.

Three (3) sliding members of Example 10 were thus obtained.

Evaluation 7

The density and the bending strength of the sliding members of Examples 9-10 were measured. The results are shown in Table 3.

the bending strength of the sliding members of Examples 9-10 were improved.

Evaluation 8

To examine the abrasion resistance of the sliding members of Examples 9-10, an abrasion test was conducted with the LFW friction/abrasion tester under the following conditions:
Oil lubrication;
Load of 15 kgf;
Speed of 160 r.p.m.;
Testing time of 15 minutes; and
Mating member made of SUJ2 (as per JIS).
The results of this abrasion test on the sliding members of Examples 9-10 are shown in FIG. 7.

Figure 7:
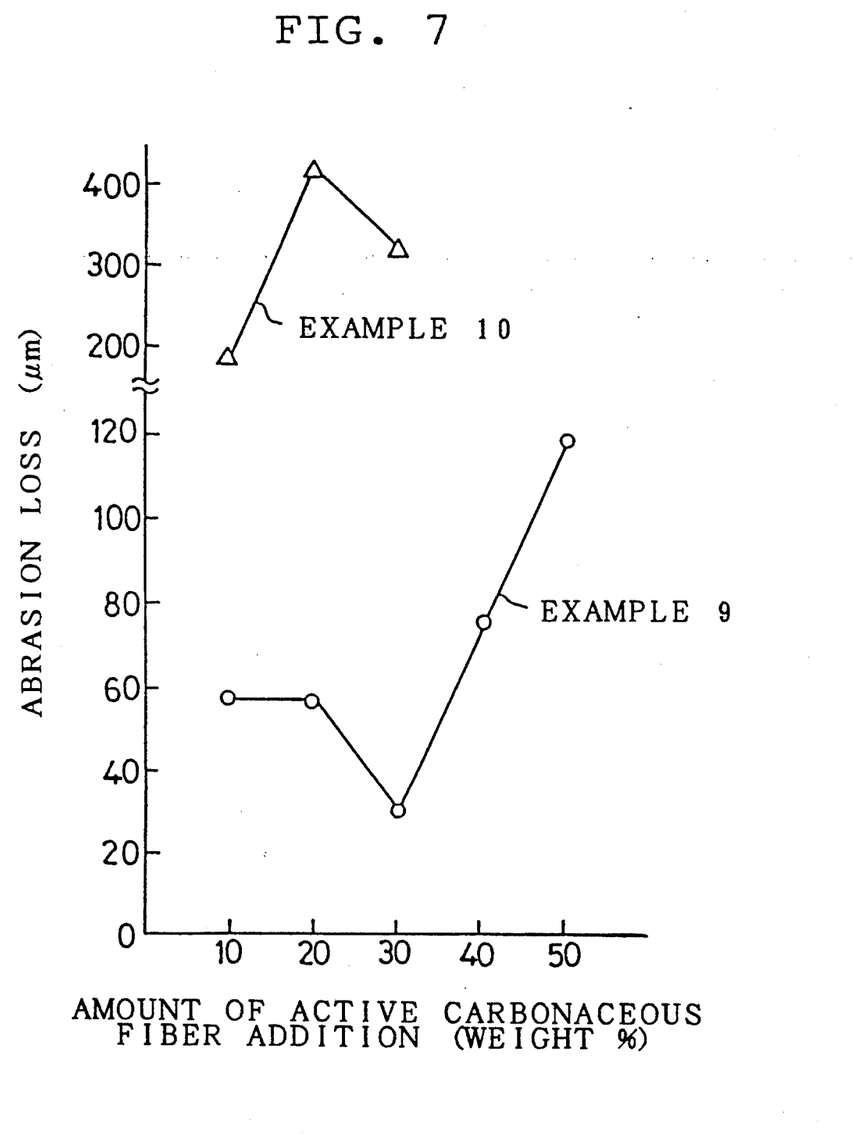
FIG. 7 is a line chart showing the results of the abrasion resistance test on the sliding members of Examples 9 and 10.

It is readily understood from FIG. 7 that the sliding members of Example 9 using the optically isotropic infusible pitch fiber had more excellent abrasion resistance than the sliding members of Example 10 using the optically anisotropic infusible pitch fiber did.

Evaluation 9

An abrasion test was conducted to examine the abrasion resistance of the sliding member (ST30) of Example 9 in which the optically isotropic infusible pitch fiber was added by 30 parts by weight and the sliding member (FT10) of Example 10 in which the optically anisotropic infusible pitch fiber was added by 10 parts by weight. In the abrasion test, the testing conditions of Evaluation 8 were changed variously.

Figure 8:
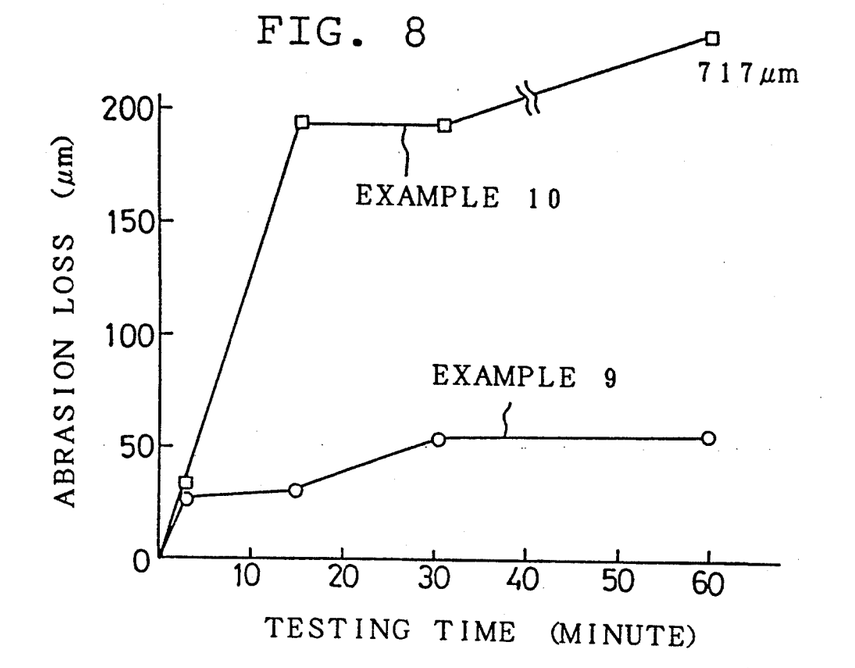
FIG. 8 is a line chart showing the results of the abrasion resistance test on the sliding members of Examples 9 and 10, in which the testing time is changed variously.

The results of the abrasion test on the sliding members of Examples 9-10 are shown in FIG. 8. In this abrasion test, the testing time was changed variously, but the other conditions were the same as the abrasion test of Evaluation 8.

Figure 9:
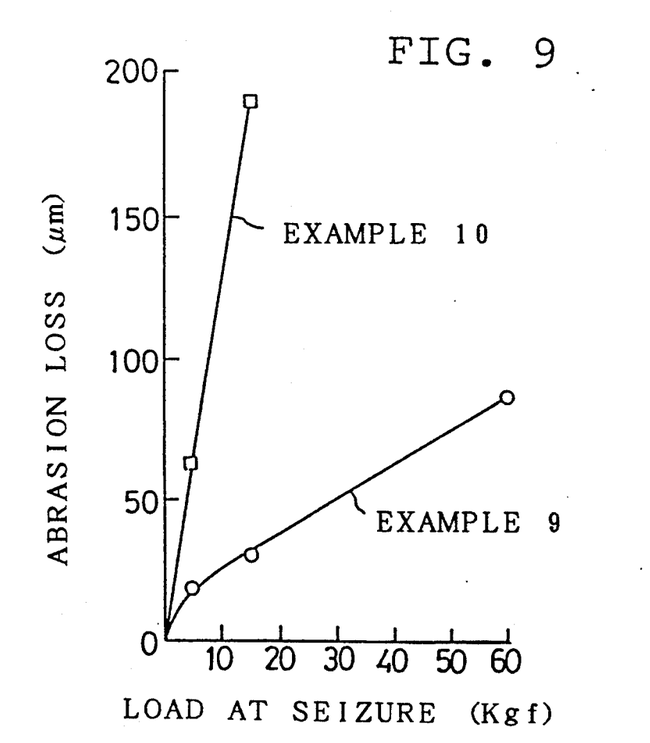
FIG. 9 is a line chart showing the results of the abrasion resistance test on the sliding members of Examples 9 and 10, in which the load is changed variously.

The results of the other abrasion test on the sliding members of Examples 9-10 are shown in FIG. 9. In this abrasion test, the load was changed variously, but the other conditions were the same as the abrasion test of Evaluation 8.

Figure 10:
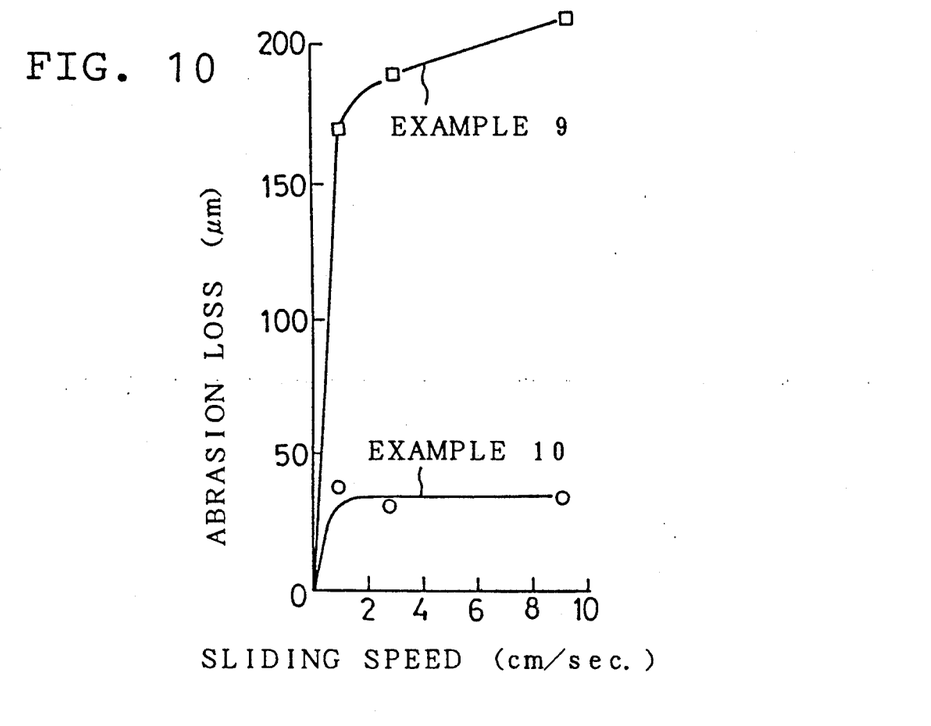
FIG. 10 is a line chart showing the results of the abrasion resistance test on the sliding members of Examples 9 and 10, in which the sliding speed is changed variously.

The results of still the other abrasion test on the sliding members of Examples 9-10 are shown in FIG. 10. In this test, the sliding speed was changed variously, but the other conditions were the same as the abrasion test of Evaluation 8.

It is readily understood from these results that the sliding member of Example 9 using the optically isotropic infusible pitch fiber had more excellent abrasion resistance than the sliding member of Example 10 using the optically anisotropic infusible pitch fiber did, and that the sliding member of Example 9 using the optically isotropic infusible pitch fiber had the abrasion property which was greatly influenced by the load but was hardly influenced by the sliding speed and the testing time.

TABLE 3

| | Sample | Optical Property | Carbonaceous Fiber (Weight %) | Carbonaceous Powder (weight %) | Density (g/cm$^3$) | Bending Strength (Kgf/cm$^2$) |
|---|---|---|---|---|---|---|
| Example 9 | ST10 | Isotropy | 10 | 90 | 1.89 | 1057 |
| | ST20 | Isotropy | 20 | 80 | 1.84 | 1031 |
| | ST30 | Isotropy | 30 | 70 | 1.84 | 930 |
| | ST40 | Isotropy | 40 | 60 | 1.74 | 766 |
| | ST50 | Isotropy | 50 | 50 | 1.67 | 615 |
| Example 10 | FT10 | Anisotropy | 10 | 90 | 1.88 | 920 |
| | FT20 | Anisotropy | 20 | 80 | 1.82 | 581 |
| | FT30 | Anisotropy | 30 | 70 | 1.69 | 409 |

It is readily understood from Table 3 that the less the infusible pitch fiber was added, the more the density and

Evaluation 10

Figure 11:
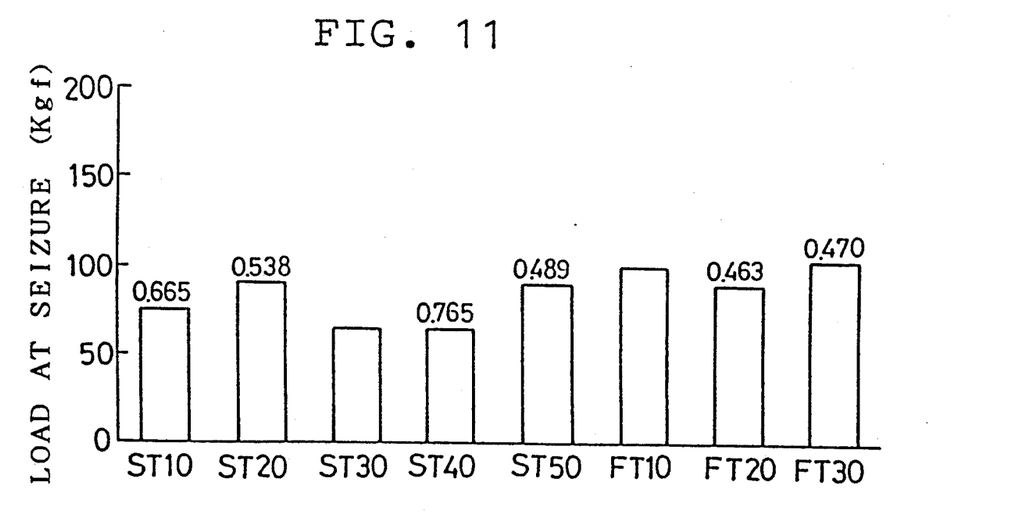
FIG. 11 is a column chart showing the results of the seizure resistance test on the sliding members of Examples 9 and 10.

To examine the seizure resistance of the sliding members of Examples 9-10, a seizure test was conducted with the machine testing laboratory type friction/abrasion tester under the following conditions:
Oil lubrication;
Load increasing at the rate of 25 kgf per 2 minutes;
Speed of 1000 r.p.m.; and
Mating member made of SUJ2 (as per JIS).
The results of this seizure test on the sliding members of Examples 9-10 are shown in FIG. 11. The values of the friction coefficient at seizure is also shown in FIG. 11.

It is readily understood from FIG. 11 that the sliding members of Example 10 using the optically anisotropic infusible pitch fiber had more excellent seizure resistance than the sliding members of Example 9 using the optically isotropic infusible pitch fiber did.

Evaluation 11

A seizure resistance test was conducted to examine the seizure resistance of the sliding member (ST30) of Example 9 in which the optically isotropic infusible pitch fiber was added by 30 parts by weight and the sliding member (FT10) of Example 10 in which the optically anisotropic infusible pitch fiber was added by 10 parts by weight. The seizure resistance test was conducted with the machine testing laboratory type friction/abrasion tester under the following conditions:
No oil lubrication;
Load increasing at the rate of 10 kgf per 2 minutes;
Various sliding speeds; and
Mating member made of SUJ2 (as per JIS).
The results of this seizure test on the sliding members of Examples 9-10 are shown in FIG. 12.

Figure 12:
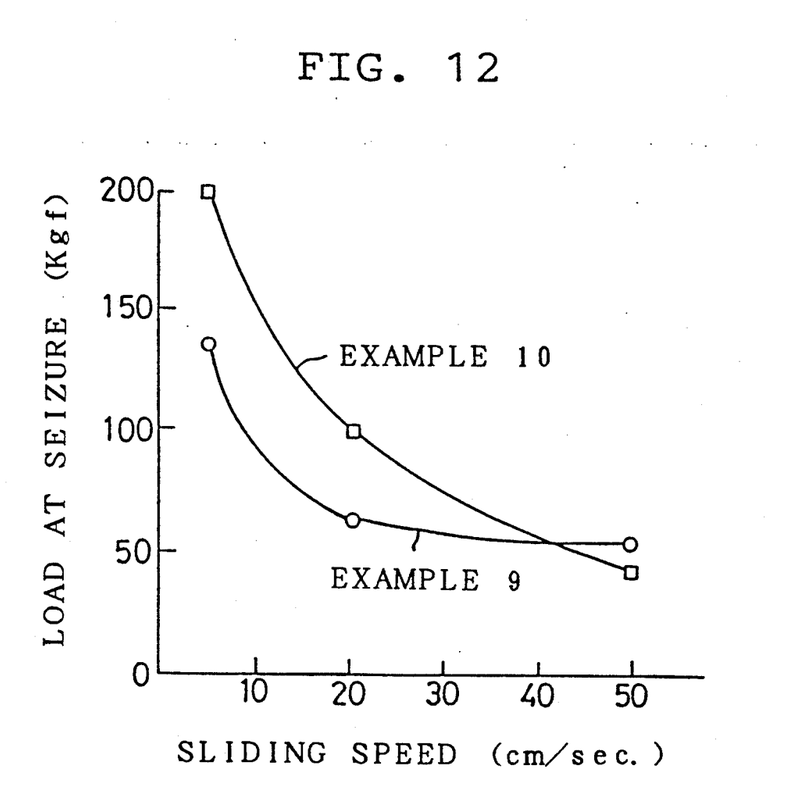
FIG. 12 is a line chart showing the results of the seizure resistance test on the sliding members of Examples 9 and 10, in which the sliding speed is changed variously.

It is readily understood from FIG. 12 that the sliding member of Example 10 using the optically anisotropic infusible pitch fiber had more excellent seizure resistance than the sliding member of Example 9 using the optically isotropic infusible pitch fiber did when the sliding speed was less than 40 cm/sec.

What is claimed is:

1. A sintered body of carbon fiber reinforced carbon formed by sintering a green compact molded of a mixture comprising precursor carbonaceous fiber which has not been completely carbonized and self-sintering carbonaceous powder.

2. The sintered body according to claim 1, wherein said precursor carbonaceous fiber is one selected from the group consisting of pitch fiber and a polymer fiber which as been decomposed at a temperature less than 550° C.

3. The sintered body according to claim 2, wherein said pitch fiber is obtained by spinning pitch.

4. The sintered body according to claim 3, wherein said pitch fiber is subjected to a surface treatment comprising contacting said pitch fiber with a viscous material selected from the group consisting of tar, pitch and organic polymers.

5. The sintered body according to claim 2, wherein said pitch fiber is an infusible pitch fiber obtained by heating said pitch fiber at 150° to 500° C. in an oxidizing atmosphere.

6. The sintered body according to claim 5, wherein said infusible pitch fiber is subjected to a surface treatment comprising contacting said infusible pitch fiber with a viscous material selected from the group consisting of tar, pitch and organic polymers.

7. The sintered body according to claim 2, wherein said pitch fiber is optically isotropic.

8. The sintered body according to claim 2, wherein said pitch fiber is optically anisotropic.

9. The sintered body according to claim 2, wherein said polymer fiber is fiber.

10. The sintered body according to claim 9, wherein said polyacrylonitrile fiber is subjected to a surface treatment comprising contacting said polyacrylonitrile fiber with a viscous material selected from the group consisting of tar, pitch and organic polymers.

11. The sintered body according to claim 2, wherein said precursor carbonaceous fiber is subjected to a surface treatment comprising contacting said fiber with coal tar.

12. The sintered body according to claim 1, wherein said self-sintering carbonaceous powder is one selected from the group consisting of mesocarbon microbeads, pulverized bulkmesophase powder, pulverized low temperature calcined coke, and pulverized crude coke.

13. The sintered body according to claim 12, wherein said self-sintering carbonaceous powder is mesocarbon microbeads.

14. The sintered body according to claim 1, wherein said precursor carbonaceous fiber uniformly distributed in said green compact while being oriented at random.

15. The sintered body according to claim 1, wherein said precursor carbonaceous fiber is short fiber having the length of 0.01-50 mm.

16. A shaped sliding member composed of a sintered body formed by sintering a green compact of a mixture comprising precursor carbonaceous fiber which has not been completely carbonized and a self-sintering carbonaceous powder, said precursor carbonaceous fiber being distributed in said self-sintering carbonaceous powder.

17. A process for producing carbon fiber reinforced carbon sintered body, comprising;
- a first step of mixing precursor carbonaceous fiber which has not been completely carbonized and self-sintering carbonaceous powder, thereby obtaining a mixture thereof;
- a second step of forming said mixture into a shaped green compact; and
- a third step of sintering said green compact, thereby obtaining a sintered body.

18. The process according to claim 17, wherein said precursor carbonaceous fiber is one selected from the group consisting of pitch fiber and a polymer fiber which has been decomposed at a temperature less than 550° C.

19. The process according to claim 18, wherein said pitch fiber is obtained by spinning pitch.

20. The process according to claim 19, wherein said pitch fiber is subjected to a surface treatment comprising contacting said pitch fiber with a viscous material selected from the group consisting of tar, pitch and organic polymers.

21. The process according to claim 18, wherein said pitch fiber is an infusible pitch fiber obtained by heating said pitch fiber at 150° to 500° C. in an oxidizing atmosphere.

22. The process according to claim 21, wherein said infusible pitch fiber is subjected to a surface treatment comprising contacting said pitch fiber with a viscous material selected from the group consisting of tar, pitch and organic polymers.

23. The process according to claim 18, wherein said pitch fiber is optically isotropic.

24. The process according to claim 18, wherein said pitch fiber is optically anisotropic.

25. The process according to claim 18, wherein said polymer fiber is polyacrylonitrile fiber.

26. The process according to claim 25, wherein said polyacrylonitrile fiber is subjected to a surface treatment comprising contacting said polyacrylonitrile fiber with a viscous material selected from the group consisting of tar, pitch and organic polymers.

27. The process according to claim 18, wherein said precursor carbonaceous fiber is subjected to a surface treatment conducted by stirring 100 parts by weight of said precursor carbonaceous fiber with 100–1000 parts by weight of a viscous material selected from the group consisting of tar, pitch and organic polymers, thereby obtaining a mixture thereof, by washing said mixture with an organic solvent, and by drying said mixture.

28. The process according to claim 17, wherein said first step of mixing is conducted by mixing 100 parts by weight of said precursor carbonaceous fiber and 2–70 parts by weight of said self-sintering carbonaceous powder.

29. The process according to claim 17, wherein said third step of sintering is conducted by sintering said green compact at 700°–1300° C., thereby completely carbonizing and solidyfing said precursor carbonaceous fiber and self-sintering carbonaceous powder.

30. The process according to claim 29, wherein said green compact is graphitized at a temperature of 1500° to 3000° C. after said sintering.

31. The process according to claim 17, wherein said second step is carried out by putting said mixture in a mold and pressing said mixture in said mold.

32. The process according to claim 17, wherein said second step is carried out by C.I.P.

33. A sintered body of carbon fiber reinforced carbon formed by sintering, at a temperature in the range of about 700° C. to 1300° C., a green compact molded of a uniform mixture of (1) precursor carbonaceous fiber selected from the group consisting of pitch fiber and a polymer fiber which has been decomposed at a temperature not higher than 550° C. and (2) self-sintering carbonaceous powder selected from the group consisting of mesocarbon microbeads, pulverized bulkmesophase powder, pulverized low temperature calcined coke and pulverized crude coke, wherein said fiber is uniformly distributed and randomly oriented in said powder.

34. The sintered body of claim 33, wherein said fiber has been subjected to a surface treatment prior to mixing with said powder, said surface treatment comprising contacting said fiber with a viscous material selected from the group consisting of tar, pitch and organic polymers, washing with an organic solvent and drying.

35. The sintered body of claim 33, wherein said mixture comprises 100 parts by weight of said fiber and 2–70 parts by weight of said powder.

36. The sintered body of claim 33, wherein said green compact has been completely carbonized during sintering and then graphitized.

37. The sintered body according to claims 1, 16, or 33, wherein said sintered body has an abrasion loss of no more than 200 $\mu$m in an abrasion test conducted under the following conditions with an LFW friction/abrasion tester: oil lubrication, load of 15 kgf, speed of 160 r.p.m., testing time of 15 minutes, and mating member made of JIS-SUJ2.

38. The sintered body according to claim 37, wherein said precursor carbonaceous fiber is an infusible pitch fiber of isotropic coal pitch, and said self-sintering carbonaceous powder is coal tar mesocarbon microbeads.

39. The sintered body according to claim 38, wherein said abrasion loss is no more than 120 $\mu$m.

40. The sintered body according to claim 37, wherein said abrasion loss is no more than 50 $\mu$m.

41. The sintered body according to claim 3, wherein the spinning of said pitch is carried out at 300° to 400° C.

42. The sintered body according to claim 5, wherein the heating of said pitch fiber is carried out for 0.5 to 5 hours.

43. The shaped sliding member according to claim 16, wherein said precursor carbonaceous fiber is an infusible pitch fiber.

44. The process according to claim 19, wherein the spinning of said pitch is carried out at 300° to 400° C.

45. The process according to claim 21, wherein the heating of said pitch fiber is carried out for 0.5 to 5 hours.

46. The shaped sliding member according to claim 43, wherein said infusible pitch fiber is obtained by heating said pitch fiber at 150° to 500° C. in an oxidizing atmosphere.

47. The shaped sliding member according to claim 46, wherein said heating of said pitch fiber is carried out for 0.5 to 5 hours.

* * * * *

UNITED STATES PATENT AND TRADEMARK OFFICE
CERTIFICATE OF CORRECTION

PATENT NO. : 5,202,293

DATED : April 13, 1993

INVENTOR(S) : Mamoru Okamoto, Hirohisa Miura, Yoshio Huwa et al.

It is certified that error appears in the above-identified patent and that said Letters Patent is hereby corrected as shown below:

Claim 2, column 13, line 51, "as" should read --has--.

Claim 9, column 14, line 6, after "is", insert --polyacrylonitrile--.

Signed and Sealed this

Twenty-first Day of December, 1993

Attest:

BRUCE LEHMAN

*Attesting Officer*     *Commissioner of Patents and Trademarks*